United States Patent [19]

Barbara et al.

[11] Patent Number: 5,926,789
[45] Date of Patent: Jul. 20, 1999

[54] AUDIO-BASED WIDE AREA INFORMATION SYSTEM

[75] Inventors: Daniel Barbara, Mercer County; Shamim A. Naqvi, Morris County, both of N.J.

[73] Assignee: Bell Communications Research, Inc., Morristown, N.J.

[21] Appl. No.: 08/770,025

[22] Filed: Dec. 19, 1996

[51] Int. Cl.[6] .................................................... G01L 9/06
[52] U.S. Cl. ................................. 704/275; 704/272
[58] Field of Search .................................. 704/251, 270, 704/275, 272; 379/69, 67, 88.04, 88.02, 88.03, 88.17, 88.18, 88.23

[56] References Cited

U.S. PATENT DOCUMENTS

| | | | |
|---|---|---|---|
| 4,870,686 | 9/1989 | Gerson et al. | 704/251 |
| 5,351,276 | 9/1994 | Doll, Jr. et al. | 379/67 |
| 5,524,141 | 6/1996 | Braun et al. | 379/93 |
| 5,539,808 | 7/1996 | Innis et al. | 379/67 |
| 5,572,643 | 11/1996 | Judson | 395/793 |
| 5,586,235 | 12/1996 | Kauffman | 395/761 |
| 5,671,354 | 9/1997 | Ito et al. | 395/187.01 |
| 5,681,108 | 10/1997 | Miller | 364/411 |
| 5,761,280 | 6/1998 | Noonen et al. | 379/93.27 |

*Primary Examiner*—Richemond Dorvil
*Attorney, Agent, or Firm*—Joseph Giordano; David A. Hey

[57] ABSTRACT

A wide area information system includes a client and at least one server on which audio data is stored. Audio data is selectively transferred to the client from the server by at least occasionally establishing a transfer connection between the server and the client. The transfer of audio data is controlled by user-selected commands and inputs that are entered via an input interface provided on the client. These commands and inputs are also transferred to the server via the at least occasionally established transfer connection between the client and the server. The audio data on the server is organized in page units that are cross-linked by way of hyperaudio links. The page units are characteristically searchable with the use of cyclically repeating directory pages of audible directory information. Finally, a data protocol is defined for enabling such an audio-based system.

44 Claims, 3 Drawing Sheets

AUDIO-BASED WIDE AREA INFORMATION SYSTEM

BACKGROUND OF THE INVENTION

1. Field of Invention

The present invention relates to a wide area information system for organizing and accessing information, as well as methods for implementation thereof.

2. Description of Related Art

The popularity of the World Wide Web (WWW) segment of the Internet has risen dramatically in the recent past as the general public has become more aware of its existence. However, despite its popularity and diversity, audio information plays a noticeably small role on the WWW.

Current uses of audio on the WWW include the ability to download audio segments from certain WWW sites. Typically, a user must wait, sometimes for extended periods of time, until the entire audio file is transmitted before the audio file can be heard.

A system developed at Texas Instruments, Inc. allows a user to access the WWW through a speech interface, thereby obviating conventional point and click access to WWW hyperlinks. However, this system still requires a visual display terminal to show the data being browsed and to guide the input of commands. According to the TI system, a user can "jump" to different pages by speaking the name of a hyperlink.

It can be seen in the foregoing conventional systems that audio is still substantially a secondary object. First, the bulk of the information on a WWW page is simply not audio information. Second, the user still requires a visual interface to enable navigation, even with, for example, the TI speech interface.

This latter issue is a problem when a user does not have access to a computer or the like, or is engaged in activities that require the user's visual attention, such as driving an automobile.

However it is felt that audio remains an important medium for information, and can satisfy heretofore unmet demands in wide area information systems.

However, in applications where attempts have been made to use audio as the primary operational medium, such as phone menu systems (such as voice mail), such systems frequently overwhelm a user by requiring the user to memorize menu lists, yet presenting so much information in such lists that recollection is made difficult or impossible.

SUMMARY OF THE INVENTION

It is therefore an object of the invention to provide a client-server based wide area information system using audio as a primary medium for the information.

The client, sometimes called the virtual client, according to the present invention can play audio files, respond to commands input via an interface, and communicate with servers to retrieve "pages" of audio information. The client may be embodied by any number of devices, such as a telephone, a personal computer, a workstation, or a radio.

Servers provide audio information in units generally called audio pages, similar to the WWW. (Later in this discussion, a distinction is made between Audio Web pages and directory pages.) The audio pages are indexed via a directory service. Typically, according to the present invention, a searchable directory page is cyclically presented to the user. Generally each directory level contains audio links to a sub-directory page. The last level of the directory service points to individual audio pages (i.e. Audio Web pages) that are registered in the directory service.

These and other objects and novel features of the present invention will become more apparent from the following detailed description, taken in conjunction with the accompanying drawings.

DESCRIPTION OF THE PREFERRED EMBODIMENTS

The present invention is initially described herein in terms of using audio information as the basis of the system. However, this is done by way of example only, in order to fully illustrate the concepts related to the present invention. It is explicitly contemplated, as discussed later, that these concepts can be applied in other forms or combinations, such as multimedia environments.

Figure 1:
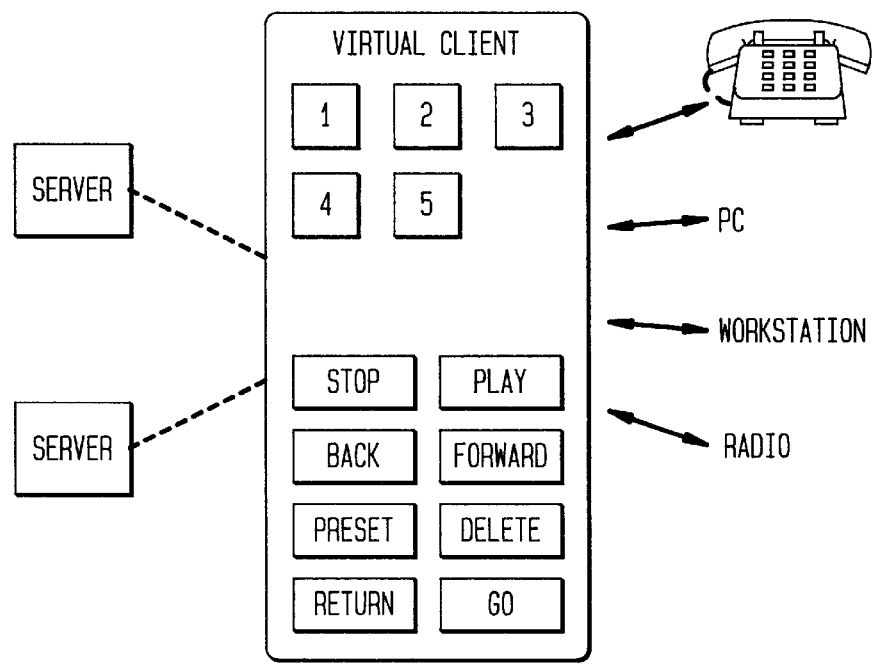
FIG. 1 illustrates an audio client according to the present invention.

FIG. 1 illustrates a virtual audio client, and its role in the client-server system according to the present invention.

The virtual audio client (interchangeably referred to herein as "client") is the means by which a user navigates the Audio Web. As illustrated in FIG. 1, the client can recognize several inputs and commands. For example, the client may recognize the input of the first five cardinal numbers (one through five), and the commands STOP, PLAY, FORWARD, BACK, PRESET, DELETE, RETURN, and GO.

The client is shown in FIG. 1 with an appearance similar to a video cassette recorder remote control, with buttons corresponding to the aforementioned inputs. However, this is only illustrative, and the actual manner in which the client is implemented depends on the tangible device in which the client is embodied. That is, the manner in which a user "presses" one of the conceptual input buttons shown in FIG. 1 depends on the device being used to access the client. For example, a user might use a telephone, a personal computer, a workstation, a radio, etc.

If a telephone is used, for example, the client may be implemented by establishing a connection between the telephone and a computing device. The connection may be a local (i.e., hardwire) one, or it may be established by dialing to a computing facility that communicates with the phone via a standard phone connection.

A user issues commands using the phone by pressing respective keys on the telephone, with each key on the telephone being mapped to correspond to a certain command. The standard tones generated by the telephone in response to pressing respective number keys are transmitted to the computer, which is suitably able (via conventional sound recognition software) to recognize the tones so as to trigger corresponding programs to implement the desired command(s).

Alternatively, a user verbalizes commands into the phone. The computer, equipped with suitable voice recognition software (for example, speaker independent with a limited vocabulary), would map the recognized spoken command to the corresponding command program.

If a PC or workstation were used to implement the client, the implementing input device and the computing device would come in a single "package". In this instance, a user might provide input using a graphical interface combined with a mouse-type control device.

It is emphasized that the foregoing examples are by way of illustration, and are not meant to limit the means by which the client according to the present invention may be implemented. For example, a more extensive discussion of using radio transceivers appears later in this disclosure.

To give an overview of the Audio Web as contemplated, the following hypothetical scenario is offered in a dialogue format, illustrating the input provided by a user and the action of the client and server(s). In the scenario, a user is interested in finding information about the Beatles Anthology (from Capitol Records).

Client: "Welcome to the Audio Web directory server. We have lots of interesting subjects for you: Martinis . . . Mice . . . Music!"
User: STOP (by "pressing" the STOP key on the virtual client or verbalizing "Stop").
Client: "Please select one of the following choices: ONE: Music, TWO: Marine Life, THREE: Libraries, FOUR: Land Irrigation, FIVE: Kites"
User: ONE (by "pressing" or verbalizing the command).
Client: <contacts the appropriate server for the requested audio page>
Server: <sends the audio page over to the client>
Client: "You selected the music directory. All kinds of music can be reached from here!
   Baroque<a sample of a baroque piece is played >. . .
     Rock<a sample of rock music track is played >. . . "
User: STOP
Client: "Your choices are: ONE: Samba, TWO: Rock, THREE: Jazz, FOUR: Mambo, FIVE: Polkas"
User: TWO
Client: <contacts the appropriate server for the requested page>
Server: <sends the page over to the client>
Client: "This is the Rock page: hear more about the greatest groups of all time: Beatles, . . . "
User: STOP
Client: "You want to go to ONE: Beatles, TWO . . . "
User: ONE
Client: "Welcome to the Audio Web Magical Mystery Tour!!
  These pages contain a collection of Beatles sound files.
   Check out the new Anthology page for the latest Beatles release!
   <a sample of the new Beatles track is played>. . . "
User: STOP
Client: "Want to visit the ONE: Anthology page, TWO: John Lennon page, THREE: Paul McCartney page, FOUR: George Harrison page, FIVE: Ringo Starr page"
User: ONE
Client: <contacts the appropriate server for the requested page>
Server: <sends the page over to the client>
Client: "<The initial part of the new Beatles track 'Free as a Bird' starts playing>. . . "

Thus, the system according to the present invention requires the following functionality.

A user is provided with a way to search the Audio Web to locate audio pages of interest using a directory service. As seen in the foregoing hypothetical example, such a navigation means through the Audio Web is vital. In the example, the first three pages retrieved were directory pages that were "stacked" according to the hierarchical structure shown in FIG. 2.

Once in a page, "hyperaudio" links are provided to other pages, (frequently, but not always, associated with related subjects). As seen above, for example, the user jumped from the Something New page to the Anthology page using the appropriate hyperaudio link. Hyperaudio links are generally analogous to hypertext links in the WWW (and are interchangeably referred to herein as "audio links").

The user can input commands and other information (via the client) to control navigation through the Audio Web. The user could, for example, jump back to the Something New page after finishing with the Anthology page, then back to the Beatles page again, using appropriate navigational commands, as discussed below.

The user can also place a bookmark to mark a particular audio page, thereby enabling a direct jump to that page instead of navigating through one or more directories. Furthermore, a bookmark list is provided to catalog a user's selected bookmarks.

Audio pages can be authored and included in directory page hierarchies. Also, authors can incorporate hyperaudio links in their audio pages.

Finally, a standard protocol for transmitting audio tracks is used.

To let users find pages of interest, the following schema of directories is used. When downloaded, each directory is a stream of menu choices that is cyclically presented to the user in an audible manner. The directory format is, of course, use-specific, but is preferably informative, entertaining, and, most importantly, searchable. The user's first contact with the Audio Web is with a home directory page 10, similar to a "home page" page on the WWW (see FIG. 2). This home directory page 10 contains hyperaudio links 16 to one or more sub-directory pages 12. This structure continues for a number of levels, forming a hierarchical tree structure such as the one generally depicted in FIG. 2. The directory pages 14 (leaf nodes) in a last, or lowermost, level are individual audio pages that have been registered in the directory page.

Figure 2:
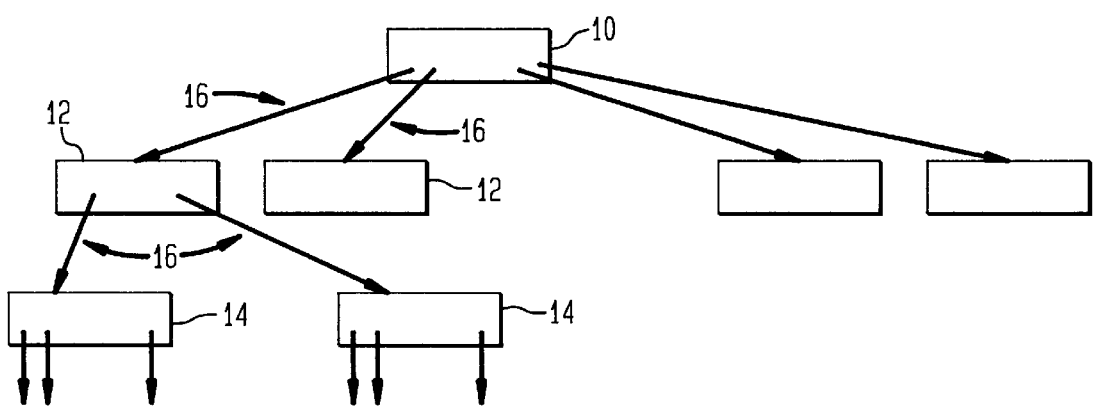
FIG. 2 schematically illustrates the hierarchy of the directory service levels according to the present invention.

The stacked "tree" organization shown in FIG. 2 is desirable because the fanout of links is kept to a reasonable number while providing manageable indexing for a large number of audio pages. The tree organization used here is comparable to the B-tree organization commonly used in database management systems. Each audio page has a maximum number of audio links and fixed capacity for audio information. This is advantageous because the user is not overwhelmed by extraneous information clutter while listening to a directory page, and, more importantly, the number of choices in any given option menu does not become excessive, such that the user is burdened by having to remember large numbers of choices.

Another way to organize the pages according to the present invention (not illustrated) is to provide a non-stacked plurality of pages in which a given page is linked to at least one other page by a hyperaudio link, without a stacked hierarchy.

Each hyperaudio link is associated with a portion of the audio track of an audio page, in the same manner that a hypertext link in the WWW is associated with a highlighted portion of the text on a page.

Figure 3:
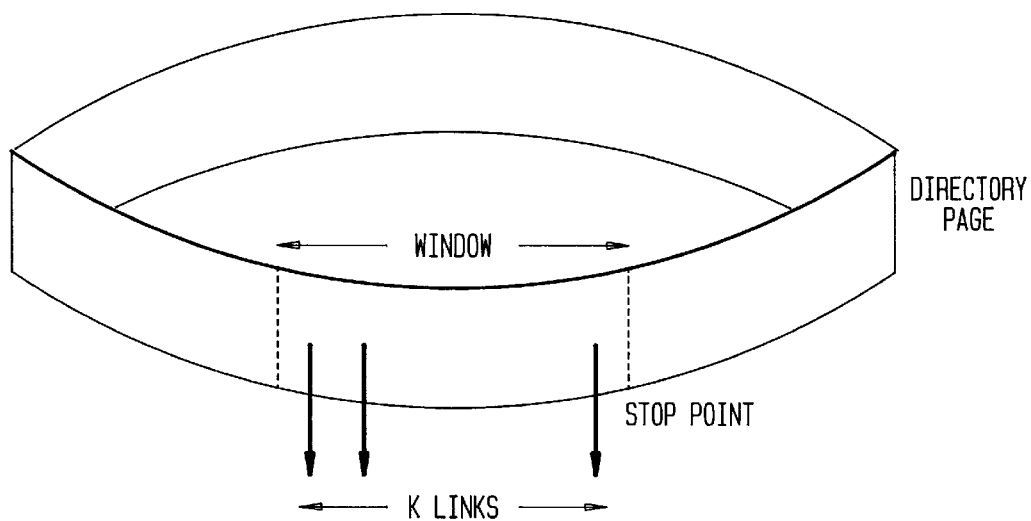
FIG. 3 illustrates an option menu "window" from a cycling directory page.

As mentioned above, when a user first connects to an Audio Web server, the first audio page the user encounters is a home directory page, which is in the form of a repeating audio track, generally listing a plurality of hyperaudio links. In order to use this directory, the user issues a STOP command from the client, (for example, when an audio link of interest is heard). The directory then provides an option menu consisting of the last k (for example, five) hyperaudio links located before the STOP command was issued. FIG. 3 illustrates the concept of the repeating directory page, and, more specifically, the set of k hyperaudio links defined in a window according to a STOP command issued by the user.

At this point, the user hears a new audio track naming the k hyperaudio links. Such an audio track might be as follows:

"These are your choices at this point:
  One: <name of the 1st hyperaudio link>;
  Two: <name of the 2nd hyperaudio link>;
  Three: <name of the 3rd hyperaudio link>. . ."

up to the kth hyperaudio link. The user then makes a selection by inputting the corresponding number via the client. The system therefore defines a dynamic option menu based on a time-based window of the past k links. It will be appreciated that this concept of a dynamic window guarantees that the user will be presented each time with a set of k options, regardless of the fanout (i.e. the total number of hyperaudio links defined on the given audio page). This is advantageous because the user need only deal with a relatively small number of options at any one time, keeping the selection thereof manageable.

However, even with the dynamic window concept, a user still could be faced with listening to a large list of hyperaudio links before finding a topic of interest.

Therefore, according to the present invention, a method is provided for facilitating searching through directory pages. In particular, a binary search methodology is useful here. Binary searching is known as a recursive way to quickly search through ordered items.

Figure 4:
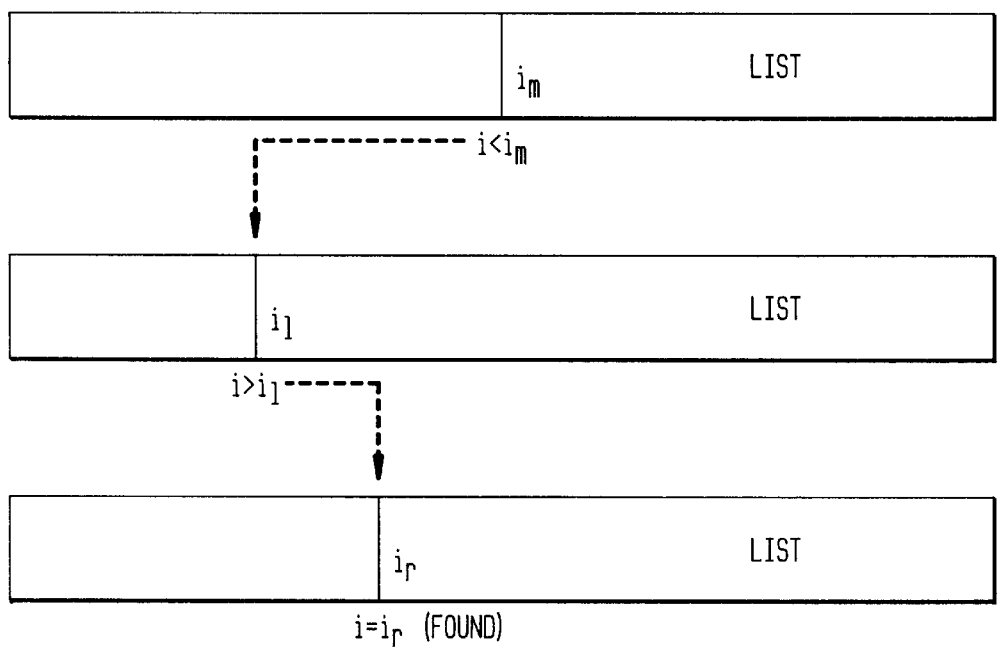
FIG. 4 illustrates a binary searching method usable with the present invention.

FIG. 4 is a general illustration of the binary search methodology. In the first "pass", the search starts from the item $i_m$ at the middle of the list. If $i_m$ is "bigger than" (for example, numerically greater than, or alphabetically after) the item $i_r$ being sought, the search is moved to the "left" of the middle of the list, toward the "lower" end of the list. On the other hand, if $i_m$ is "smaller than" (for example, numerically smaller than, or alphabetically preceding) the item being sought, the search is moved to the "right" of the middle of the list, toward to the "higher" end.

Generally, each move is to the middle of one of the subportions defined by the middle point at the start of the pass. Therefore, in the first pass illustrated in FIG. 4, the move is, in general, made from the middle of the entire list $i_m$, to the middle of one of the two subportions (in this case, halves) defined by $i_m$, where each of these subportions extends between $i_m$ and one of the ends of the entire list.

Thus, as illustrated in FIG. 4, in the first pass, a decision is made that $i_r < i_m$. Therefore, the first move is made to the left from $i_m$ to $i_1$, where $i_1$ is the item midway between the end of the list and item $i_m$.

In the second pass, a decision is made that $i_r > i_1$. Therefore, the second move is made to the right from $i_1$ to $i_r$, since item $i_r$ is midway between $i_1$ and $i_m$. Since $i_r$ happens to be the item being sought, the search is complete.

The recursive "narrowing down" process continues as necessary to arrive at the item being sought. It is known that the number of passes necessary is proportional to the logarithm of the size (number of items) of the entire list.

As applied to the present invention, the binary search is used in a browsing/searching system in the following manner.

When a user wants to search an audio track (which can be done at any time while the audio track is being played), the user inputs a BACK or FORWARD command, as appropriate. In response, the browser locates the middle time point $t_m$ between the current time position $t_1$ in the audio track and the end or start of the audio track, $t_e$. The browser then plays the audio track from $t_m$ forward. If the user decides that the item being sought is before (i.e., to the "left" of) $t_m$, then a BACK command is issued, and the browser plays the audio starting from the midpoint between $t_1$ and $t_m$. On the other hand, if the user decides that the item being sought is after (i.e., to the "right" of) $t_m$, then a FORWARD command is input, making the audio playback advance to the midpoint between $t_m$ and $t_e$.

As was explained relative to FIG. 4, when this approach is repeated, the search arrives at the target item relatively quickly. When the user finally arrives at the target item, the user issues a STOP command. Thereafter, the above-described dynamic menu window is built, based on the target item.

Figure 5:
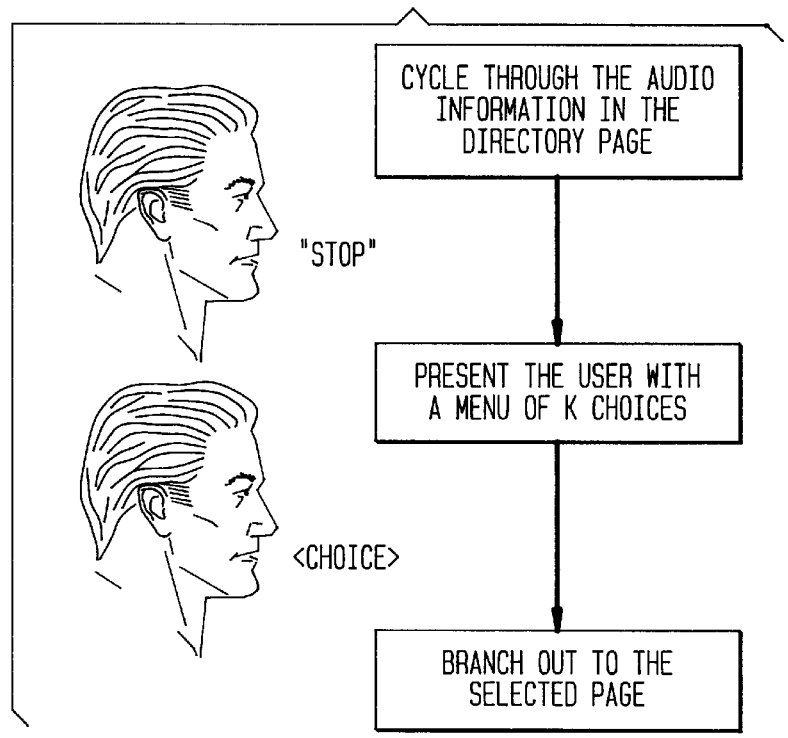
FIG. 5 conceptually illustrates the process of navigating a directory page.

Once the user selects a hyperaudio link from the dynamic menu window, the corresponding audio page is sent to the client from the server, and the above-described process begins over. More specifically, if the newly selected audio page is a directory, the user will hear again repeated audio information, as described above. If the newly selected audio page is an Audio Web page, then the user hears the audio information contained therein, and can use it as desired. FIG. 5 illustrates the concept of the navigating the Audio Web according to the present invention.

Audio Web pages are processed in a manner similar to directory pages. The only substantive difference is that Audio Web pages are not repeated as directory pages are. The user receives the information linearly, as presented in the description of the page. When hearing this audio information, the user can use the STOP command, which prompts a menu of choices formed by the last k hyperaudio links in the page, as illustrated in FIG. 3. Thereafter, the user can select a number corresponding to the hyperaudio link of choice, and branch or jump to the new page corresponding to that hyperaudio link (see, again, FIG. 5).

It will be appreciated that, over time, the user will probably come across many pages to which he or she will wish to return later, but without having to go through the relatively time-consuming process of searching through the directories. A bookmark, as its name implies, simply "marks" a particular page of interest so that it can be jumped to directly. Bookmarks may be accumulated in a bookmark list that can be organized as a directory page, in the manner of the directory pages discussed above. In this context, a bookmark list has the same structure as a leaf node in the directory structure.

In order the build the bookmark list, the user can use a PRESET command to assign a bookmark to a page of interest and add it to the list by adding the name of the page. The name of the page may be taken from the name of the hyperaudio link pointing to the page or, alternatively, from the name provided by (e.g., spoken by) the user, in combination with the page address. (Page addressing is discussed in more detail below.)

To retrieve a bookmarked page, the user uses a GO command that moves directly to the page in question and retrieves it for play. When the desired page is complete, the user stops the audio and proceeds to branch out to other pages using hyperaudio links on the bookmarked page.

It will be appreciated that, over time, the bookmark list may itself become relatively large, and searching it can become cumbersome. Therefore, binary searching, as described above, is again used here to manage the search of bookmarks. It is assumed that the bookmark list is ordered lexicographically, in order to apply binary searching.

An issue understandably arises as to how the audio tracks are played or the speakable commands recognized.

In the WWW, the Hypertext Transfer Protocol (HTTP) is successful because it is stateless. That is, whenever a WWW page is accessed, the server on which that page is located simply transfers the contents of that page to the client, and does not "remember" anything about the request thereafter. The client, on which the WWW browser runs, handles page layout and user interface issues. Therefore, in effect, when a hypertext link is selected ("clicked on") by the user, a separate network connection is established to bring the newly selected page to the client. This property makes WWW servers "scaleable".

This feature is also important in the Audio Web. It is impractical to have a server connected to the client continuously while the user is only manipulating a given page. Continuously remembering the state of connections and processing commands from multiple clients would be a tremendous burden on servers. Moreover, the system would be unscaleable as usage grows. Therefore, a Hyperaudio Transfer Protocol (HATP) is provided for the Audio Web and acts in a manner similar to the HTTP for the WWW.

It is a particular feature of the present invention that the HATP is a connectionless, or stateless, protocol that delivers audio pages to the client.

In the case of the Audio Web, the equivalent to the Hypertext Markup Language (HTML) will be a Hyperaudio Markup Language (HAML) with the following structure:

pagetype<audio track>
audiolinks<i: $t_i^b$, $t_i^e$, hatp address>

The pagetype indicates whether the page is a directory page or an Audio Web page. (A distinction is required here because directory pages are played cyclically whereas Audio Web pages are not.) The description of the hyperaudio links in the page is given after the entire audio track. This allows the entire audio track to be sent as a unit, preferably in a convenient data-compressed format (which may be conventionally known). Hyperaudio links have three components: link number (subscript i above), a pair of elapsed time values (relative to the beginning of the entire audio track) that represent the beginning $t_i^b$ and end $t_i^e$ of the portion of the audio track that serves as the hyperaudio link name, and finally, the HATP address of the page to which the hyperaudio link points.

HATP is preferably very similar to HTTP and should be a stateless protocol consisting of four stages:

1. Connection: establishment of a data connection by the client to a respective server, using a Universal Resource Locator (URL).
2. Request: sending a request message to the server from the client.
3. Response: sending a response message to the client from the server.
4. Close: closing the connection after the response message is complete.

Of course, some substantive differences will exist between HATP and HTTP, in terms of concepts known in HTTP.

1. The ACCEPT header line specifies HAML as the only format accepted by the client.
2. The ACCEPT-ENCODING header line specifies the encoding format of the HAML document (e.g., x-compress, x-zip, etc.) and the compressing format for the audio track (e.g., MPEG).
3. A method called AUDIOSEARCH is implemented instead of TEXTSEARCH, as in HTTP. This permits an object to be queried by an audio stream. The search form of the GET method is used to query an object.

Hereinafter, the methods by which the virtual client implements the above-described functionality, according to the present invention, are discussed.

Generally, the client runs the HATP protocol to request and receive HAML page descriptions. It also recognizes and implements the above-described set of commands (e.g., STOP, FORWARD, BACK, PLAY, PRESET, etc.). Finally, the client plays the audio tracks from Audio Web pages.

1. The STOP command

While a page is playing, the user may issue the STOP command. At that point the browser stops playing the audio track, and builds up the dynamic menu window including the last k links in the audio track prior to the point at which the STOP command was issued.

In order to do this, the browser tracks the elapsed time from the beginning of the audio track and also records the time at which the STOP command was issued. This time is represented as $t_S$. Thereafter, the Audio Web browser in the client follows the following algorithm.

Find the first link j in the link list, such that $t_j^b > t_s$;
From link j, and while searching the link list backwards, do:
menuØ(to make the menu window initially empty);
m=1;
GL (Get Link): next link i, searching backwards if item i is in menu yet
goto ST (if the page has fewer than, for example, 5 links);
else,
insert item<m, link name, link address, $t_i^b$, $t_i^e$>into menu.
m=m+1
if m<5 (for example) goto GL
ST: play the menu items in the menu list and wait for choice (a number from 1 to 5)
Retrieve the page pointed to by the link address in entry m=choice.

2. As mentioned above, the FORWARD and BACK commands are useful in connection with binary searching of the directory pages. The browser uses the following algorithms to implement these commands.

In terms of elapsed time, $t_1$ and $t_r$ are the beginning and ending endpoints, respectively, of an audio track in question, with $t_S$ being the starting point of the audio track. At the start of playback, $t_1 = t_S = 0$. As mentioned above, $t_r$ is set equal to the end time of the audio track.

a. When the FORWARD command is issued, the following procedure is followed:
Stop playing the audio track
Set $t_1 = t_S$
Set $t_S = \frac{1}{2}(t_1 + t_r)$
Start playing audio from time $t_S$.
b. If the BACK command is issued, then the following procedure is followed:
Stop playing the audio
Set $t_S = t_m$
$t_S = \frac{1}{2}(t_1 + t_r)$ Start playing audio from new time $t_S$.

3. The RETURN command is used to order the browser to retrieve the page that immediately preceded the current page. Preferably, the browser maintains a memory cache to store the page immediately preceding the current page. More preferably, the browser should remember the state in which the immediately preceding page was left, (by, for example, caching the hyperaudio link number to which the user jumped), so that the audio track in the immediately preceding page can be replayed from the point at which it was left.

4. The PLAY command is used to resume playback after the STOP command is used to stop playback. The PLAY command causes playback to restart at the point it stopped following the STOP command.

5. As mentioned above, the PRESET command is used to add a new entry to the bookmark list. It causes the browser to add a link to the current page in the bookmark list, along with the name of the link. The browser may, for example, prompt the user to verbalize the name of the link in order to add an entry to the bookmark list, or it may take the name of the link from the page in the memory cache. The bookmarked link is entered as an HAML link descriptor, as described above.

6. The GO command prompts the browser to start playing back the bookmark list as a repeating stream, thereby treating the bookmark list as a variant of the directory system described previously. After the GO command is used, the system proceeds until the user uses the STOP command in order to create a dynamic menu window, or the FORWARD or BACK commands to perform a binary search of the bookmark list.

Web pages in the WWW can be queried using text strings. Therefore, a WWW page may contain databases of information, such as city-by-city weather data, catalogs, and the like. A similar feature is provided for the Audio Web.

According to the present invention, a user queries an audio page by sending an audio string and receiving corresponding audio information in response. When presented with such a page, the client waits for the user to verbalize an query and send the request to the server using the AUDIO-SEARCH method described above.

Such audio querying requires either accurate, speaker independent speech recognition ability with a sizable vocabulary, or, in the alternative, means to "approximately match" audio streams.

The concepts related to the Audio Web, as disclosed herein, are particularly adaptable to radio listening. Therefore, the Digital HyperRadio ("DHR") is also presented here in accordance with the present invention.

Figure 6:
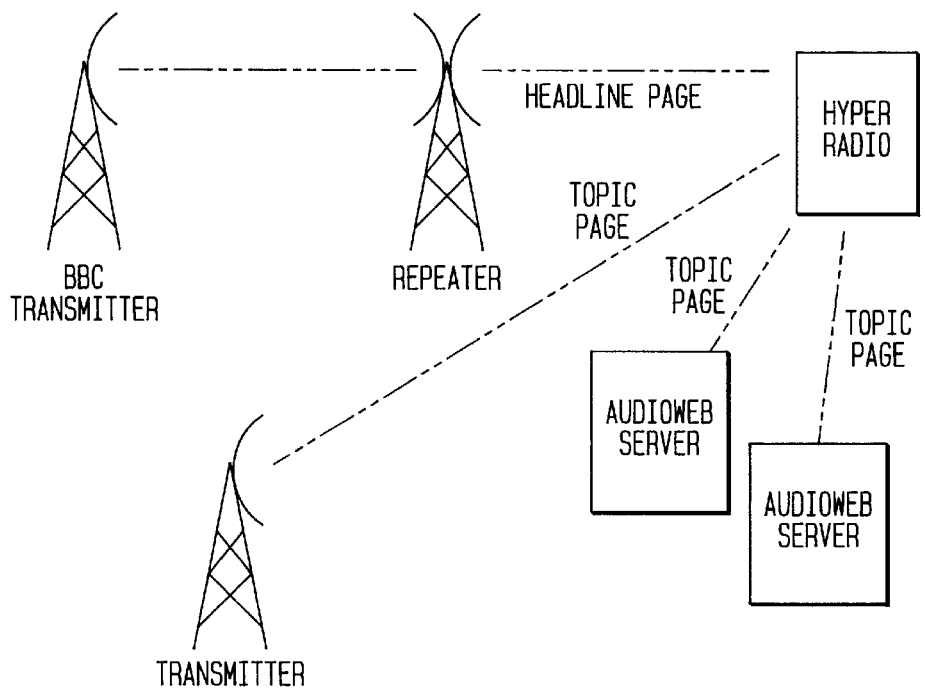
FIG. 6 illustrates a Digital HyperRadio system according to the present invention.

In order to illustrate the concept of DHR, a comparison is made in FIG. 6 to the radio transmissions of an international radio broadcast by, for example, the British Broadcasting Corporation ("BBC"). An individual listening to the BBC in New York City, for example, would tune a radio to a frequency used by a BBC repeater station. Using DHR, however, a list of hyperaudio links are broadcast using part of the available frequency band, in a manner similar to the explanation above. In effect, a radio transmission has the format of an Audio Web page using the HAML format. Each hyperaudio link points to a respective Audio Web server which provides more information about the topic named in the link. In this arrangement, therefore, the audible broadcast radio transmission consists only of news headlines, for example, while the respective full news stories are obtained in the Audio Web pages pointed to by the radio transmission "page". Using a specially equipped radio transceiver as the client, a listener stops the transmission of the news headlines, get a menu of links, select a topic of interest, and download the corresponding full news story from an Audio Web server.

The links might also point to other radio broadcast frequencies to which the radio transceiver is automatically tuned after the selecting the corresponding link. These transmissions, for example, provide expanded information on the topic carried in the initial broadcast, or offers a more elaborate list of choices.

It will be appreciated that the concepts described herein may be usefully applied to other forms of media.

For video information, directory pages might consist of cyclical streams of "trailers" (i.e., short clips from programs used to entice a viewer to view the entire program). The user stops the directory stream using the STOP command, and a dynamic menu window is created. The menu window displays five (for example) video still frames, one from each of the five trailers shown immediately prior to the use of the STOP command. The user then chooses one of the programs by inputting ONE, TWO, . . . , FIVE. Preferably, each trailer shown in the initial directory page would be overviews of a common topic, such as "Music". Thus, having selected on the initial trailers, the user sees another cyclical stream of trailers related to the common topic of the initial trailer.

Once the right video page is found, the user receives the page as a video program. The page also includes hypervideo links that each point to a different video page. As with the Audio Web, the user stops the video playback at any time during the program and builds the dynamic menu window of the last, for example, five hypervideo links identified in the program up to that point. Selecting one of the hypervideo links from the menu causes the client to download the corresponding video program from a server and start playing it.

Video pages according to the present invention are formatted in a manner similar to audio pages, with hypervideo links having the format <i: $t_i^b$, $t_i^e$, address>, where $t_i^b$, $t_i^e$ represent the beginning and end, respectively, of the frame that serves as the hypervideo link name.

Preferably, the client for this format is implemented with an interactive television unit, with a remote control unit with appropriate push-button inputs for the above-described commands. Advantageously, the data bandwidth needed to send commands uplink (to a proxy client running the software) is minimal.

Text information is also managed according to the present invention. For example, a ticker-type display of text can be used to show a cycling directory page. As before, the user stops the display at a desired location, builds a dynamic menu window, and selects an item of interest. When the desired text page is reached, it is displayed in a limited state, or elsewhere, if an extra real state is available.

Hypertext links are encoded in a manner similar to hyperaudio and hypervideo links, using tuples in the form<i: b, e, address>. The only difference is that b and e represent the displacement relative to the beginning of the text stream in bytes, instead of elapsed time.

Using TextWeb, a user uses a hand-held computer unit (sometimes known as Personal Digital Assistants, or PDAs) as the client. A PDA typically has limited computing ability and a small visual display. Nonetheless, the user can satisfactorily uses a PDA to display directory pages, dynamic menu windows, and text pages. Moreover, the user may request full text pages to be sent to other devices where they can be more easily read, such as a fax machine in a fax-on-demand mode.

Finally, a multimedia web is implemented by combining audio, video, and text into displays. In this case, all three media would be first class objects. At each stage of the web concept, the user receives multimedia information in accordance with the concepts describe above, relative to audio, video, and text.

It will be appreciated that this invention encompasses new browsers and navigators for the WWW as well. In particular, cyclical directories may be incorporated into the currently known methods of WWW navigation.

What is claimed is:

1. A wide area information system comprising:
   at least one server having at least one audio page, each of said at least one audio page having audio data and linked by cross-reference to at least one other audio page, and means for recognizing sound commands; and
   a client communicating with said at least one server so that said audio data can be selectively transferred to said client without text or a visual interface upon said at least one server receiving said sound commands.

2. The system in accordance with claim 1 wherein said at least one server includes more than one audio page arranged in a stacked hierarchy.

3. The system in accordance with claim 2, wherein said stacked hierarchy includes a home page at a topmost level, said home page having the first audio data selectively transferred to said client.

4. The system in accordance with claim 3, wherein said home page is a directory page having audio data corresponding to a repeating audio track.

5. The system in accordance with claim 4, wherein said repeating audio track includes a plurality of cross references to audio pages in a level of said hierarchy below said home page.

6. The system in accordance with claim 5, wherein said hierarchy includes a bottom-most level containing at least one page with at least one cross reference link to at least one other page.

7. The system in accordance with claim 6, wherein said hierarchy includes at least one intermediate level above said bottom-most level, said at least one intermediate level having at least one page with at least one cross reference link to a page in a level of said hierarchy above said one intermediate level, and at least one cross reference to page in a level below said at least one intermediate level.

8. The system in accordance with claim 7, wherein said client includes means for controlling the transfer of said audio data from said at least one server and for making audible said audio data transferred from said at least one server.

9. The system in accordance with claim 8, wherein said means for controlling the transfer of said audio data includes means for inputting commands for controlling said repeating audio track of said directory.

10. The system in accordance with claim 9, wherein said means for inputting commands includes means for inputting a command to stop playback of said repeating audio track.

11. The system in accordance with claim 10, wherein said client includes means for identifying a subset of said plurality of cross references in said repeating audio track immediately prior to receiving said command to stop playback of said repeating audio track.

12. The system in accordance with claim 11, wherein said client includes means for selecting one of said cross references in said subset.

13. The system in accordance with claim 12, wherein said means for identifying a subset of said plurality of cross references generates an audible list of said cross references in said subset.

14. The system in accordance with claim 13, wherein said cross references in said subset correspond to a set of cardinal numbers, wherein said means for inputting commands for controlling said repeating audio track include means for inputting a cardinal number for selecting one of said cross references in said subset whereby a page corresponding to said selected cross reference is transferred to said client via said audio data transfer connection.

15. The system in accordance with claim 14 wherein said means for inputting commands includes means for inputting a resume playback command of said audio track.

16. The system in accordance with claim 15 wherein said means for inputting commands includes means for inputting search commands whereby said repeating audio track can be searched to find a desired cross reference.

17. The system in accordance with claim 16 wherein said search commands include a forward command for advancing playback of said repeating audio track, relative to a given instant, by an interval of time, and a back command for receding playback of said repeating audio track, relative to given instant, by an interval time.

18. The system in accordance with claim 17 wherein said intervals of time by which playback of said repeating audio track is advanced or receded are variable in accordance with a binary search algorithm.

19. The system in accordance with claim 18 wherein said intervals of time by which playback is advanced or receded progressively decrease in correspondence to repeated inputs of said forward and back commands.

20. The system in accordance with claim 1, wherein said client further comprises means for making said audio data transferred to said client audible.

21. The system in accordance with claim 20, wherein said client comprises means for inputting a plurality of cardinal numbers and at least one command action.

22. The system in accordance with claim 21 wherein said means for inputting a plurality of cardinal numbers and at least one command action comprises a keypad having respective keys or combination of keys that are mapped to respective ones of said plurality of cardinal numbers and to said at least one command action.

23. The system is accordance with claim 22 wherein said client comprises a telephone having said keypad and an earpiece, and wherein said one at least one server is provided with means for recognizing tones generated by said telephone when said keys or combination of keys are pressed and wherein said means for making said audio data audible includes means for making said audio data audible in said earpiece.

24. The system in accordance with claim 22, wherein said client comprises a computer having a sound generation device and a keyboard, wherein said keyboard comprises the cardinal number input and at least one command action means, and wherein said means for making sound data audible includes means for making said audio data audible in said sound generation device.

25. The system in accordance with claim 21, wherein said means for inputting a plurality of cardinal numbers and at least one command action comprises means for recognizing spoken words corresponding to said plurality of cardinal numbers and at least one command action.

26. The system in accordance with claim 15, wherein said client comprises a telephone having a mouthpiece and an earpiece, and wherein said spoken words are received through said mouthpiece and said at least one server is provided with means for recognizing said spoken words and wherein said means for making said audio data audible includes said earpiece.

27. The system in accordance with claim 1, wherein said client includes means for identifying one of said at least one audio page with a user-created cross-referencing bookmark whereby said page is directly selectable for transfer from said at least one server to said client by selecting said bookmark.

28. The system in accordance with claim 27, wherein said client includes means for storing a plurality of said user-created bookmarks.

29. The system in accordance with claim 28, wherein said client further includes means for deleting said bookmark.

30. The system in accordance with claim 29 wherein said means for storing a plurality of bookmarks includes means for accumulating a list of bookmarks organized as a directory page.

31. The system in accordance with claim 1, wherein said client includes a memory cache having the capacity to hold at least one of said at least one audio page while a current audio page is being played by said client.

32. The system in accordance with claim 31, wherein said client includes means for moving between said current audio page and said audio page held in said memory cache.

33. In a wide area information system having at least one server, each server having at least one audio page having audio data and means for recognizing sound commands, and a client, and wherein information is stored entirely in the form of the audio page and the system is navigated without the use of text or a visual display, a method for presenting the audio data to a user comprising the steps of:

provided establishing a connection from the client to the server;

sending a sound request message having an identifier from the client to the server for one of said at least one audio page;

receiving at the client said requested audio page having audio data identified by said message request from the server;

ending said connection; and presenting, at the client, said received audio page to the user.

34. The method in accordance with claim 33 wherein said step of receiving further comprises the substep of transmitting from the server said audio page identified by said message request, and wherein said audio page includes a pagetype identifier for indicating that said audio page is a directory page having a repeating audio track or an audio web page having a linear audio track and hyperaudio links after said audio tracks, said hyperaudio links having a link number, a pair of elapsed times, and an address to which said hyperaudio links points.

35. The method in accordance with claim 34 wherein said presenting step further includes the steps of:

providing, at the client, a selection menu having a plurality of choices to the user, each of said plurality of choices corresponding to a portion of said received audio data;

selecting, at the client, one of said plurality of choices corresponding to a portion of said received audio data from said selection menu; and transferring said portion of said received audio data from the client to the server such that said audio data corresponding to said selected one is received at the client.

36. The method in accordance with claim 35 wherein said presenting step further includes the step of converting said transferred audio data into audible sound.

37. The method in accordance with claim 36, wherein said step of providing a selection menu comprises:

presenting a first set of said plurality of choices in a sequence;

stopping said presentation of said first set of plurality of choices; and presenting a second set of choices from among said first set of a choices whereby said second set makes up said selection menu.

38. A system for presenting audio information to a user comprising:

at least one server having one or more audio pages stored thereon, said audio pages having audio data and linked by cross-reference to at least one said other audio page, and means for recognizing sound commands; and a client having means for selectively requesting and receiving one of said audio pages from said server.

39. The system in accordance with claim 38 wherein said client further comprises:

means for presenting said audio data received in said audio pages to the user; and means for recognizing a plurality of inputs and a set of commands received from said user.

40. The system in accordance with claim 39 wherein said present means comprises means for making said audio data received in said audio pages audible.

41. The system in accordance with claim 40 wherein said means for recognizing a plurality of inputs and a set of commands comprises means for mapping each of or a combination of a plurality of cardinal numbers to respective ones of said inputs and to said set of commands.

42. The system in accordance with claim 41 wherein said at least one server includes more than one audio page and wherein said one or more audio pages are arranged in a stacked hierarchy having a home page at the uppermost level, an audio web page at the bottom-most level, and at least one intermediate level above said bottom-most level, said at least one intermediate level having at least one page with at least one cross reference link to a page in a level of said hierarchy above said one intermediate level, and at least one cross reference to page in a level below said at least one intermediate level.

43. The system in accordance with claim 42 wherein said means for inputting commands includes means for inputting search commands whereby said repeating audio track can be searched to find a desired cross reference.

44. The system in accordance with claim 40 wherein said means for receiving one of said audio pages comprises means for receiving radio transmission broadcasts having said audio pages, wherein each said cross-reference points to one of said at least one server, and wherein said client comprises a radio transceiver.

* * * * *

UNITED STATES PATENT AND TRADEMARK OFFICE
CERTIFICATE OF CORRECTION

PATENT NO. : 5,926,789
DATED : July 20, 1999
INVENTOR(S) : Barbara et al.

It is certified that error appears in the above-identified patent and that said Letters Patent is hereby corrected as shown below:

Column 12,
Line 61, after "claim", delete 15 and insert -- 25 --.

Signed and Sealed this

Twenty-seventh Day of November, 2001

Attest:

NICHOLAS P. GODICI
*Attesting Officer*   *Acting Director of the United States Patent and Trademark Office*